April 23, 1929.  W. R. JACKSON  1,710,645
GLARE SHIELD
Filed Nov. 21, 1927
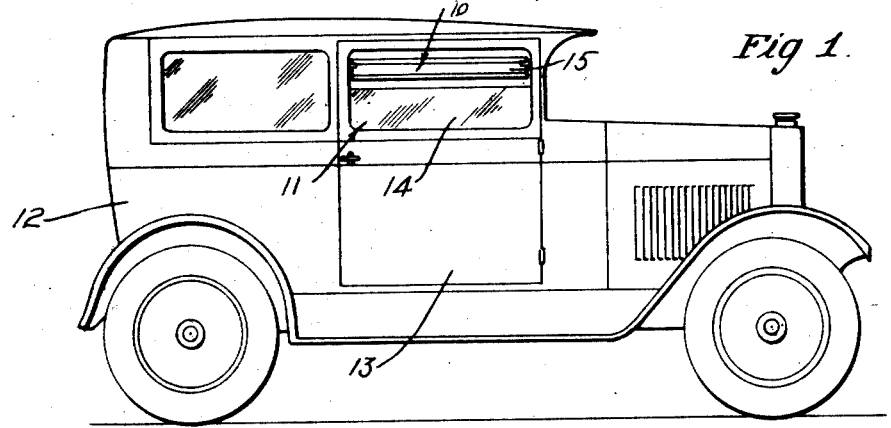
Fig 1.
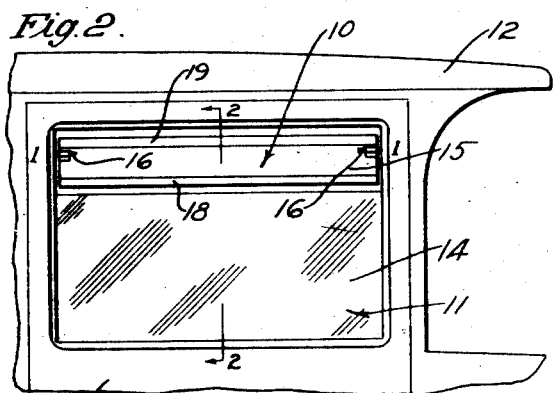
Fig. 2.
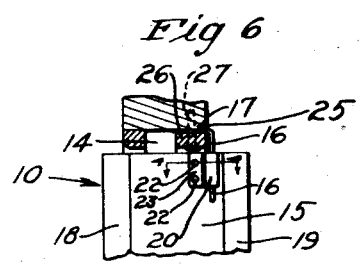
Fig 6
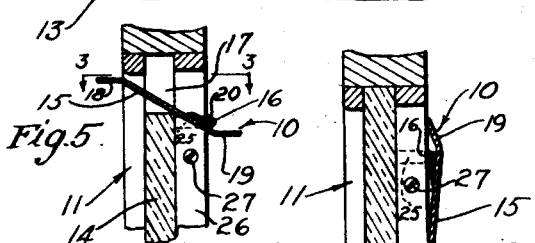
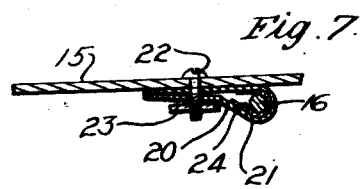
Fig. 7.
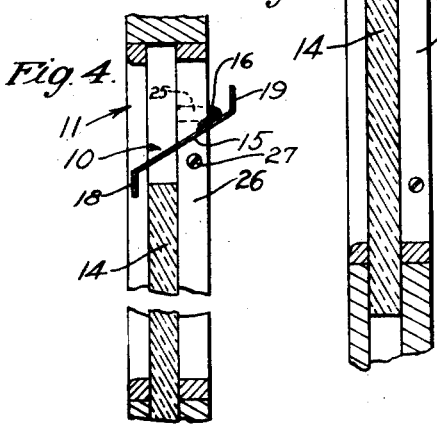
Inventor
William R. Jackson.
Attorney.

Patented Apr. 23, 1929.

1,710,645

UNITED STATES PATENT OFFICE.

WILLIAM R. JACKSON, OF HOLLYWOOD, CALIFORNIA.

GLARE SHIELD.

Application filed November 21, 1927. Serial No. 234,604.

This invention has to do with glare shields and the like, and is particularly concerned with a glare shield as applied to the window of an automobile or other vehicle. An object of the invention may be said to be the provision of a simple device of this character which is effective, neat and inexpensive.

The nature of the present invention is such as to render it applicable to various classes of windows or doors, and therefore, although it will be herein described and illustrated mainly in connection with the windows or doors of an automobile, this typification is not to be construed as being any limitation on the invention.

This invention provides a glare shield adapted to deflect the heat or glare of the sun, and which is adjustable so as to do this to best advantage. The shield is also adapted to deflect rain over a partly raised window glass, and at the same time to catch air and direct its passage upward into the top of the car, as will be later explained in more detail.

The shield is provided with a very simple mounting which is located entirely inside the window opening so that the shield swings from the inside rather than from the outside of the car, and is further so mounted as to be easily moved into an inconspicuous inoperative position when the shade is not needed, or a maximum of light is desired.

Other features and objects of the invention will be better understood from the following detailed description of a present preferred form as applied to the window of an ordinary closed car, it being distinctly understood that this particularization constitutes no limitation of the invention.

In the drawings,

Fig. 1 shows the invention in place in the window of an automobile;

Fig. 2 is a fragmentary view of a portion of the automobile showing the shield in the same position as in Fig. 1, but somewhat enlarged;

Fig. 3 is a section on 2—2 of Fig. 2, but with the window glass entirely up;

Fig. 4 is a section on 2—2 of Fig. 2, but with the shield in a different operating position;

Fig. 5 is a section on line 2—2 of Fig. 2, but with the shield swung to its inoperative position;

Fig. 6 is a section on line 3—3 of Fig. 5; and

Fig. 7 is a section on line 4—4 of Fig. 6.

In the drawings the glare shield 10 is shown to be mounted in the window 11 of automobile 12. The car door shown is the ordinary type of door 13 carrying a glass 14 which lowers into a compartment in its bottom portion. The glare shield consists of a panel 15 just slightly less in length than the width of the window opening, and is mounted at its ends on pivot pins 16 secured to the window frame 17 so that it may be rotated about an axis 1—1 through the pivot pins and thus be swung out through the window opening. The panel is so mounted that when it is in the approximately vertical position of Fig. 3, it is entirely inside of the window frame 17, and the glass 14 may be raised to the top of the window, as shown.

The two long edges 18 and 19 of panel 15 are curved or bent oppositely at a slight angle, as shown in the drawings. This gives rigidity to the panel, adds to its appearance and serves important functions which will be later pointed out. The panel consists preferably of sheet metal of just sufficient weight to give proper rigidity, and is painted or enameled black so that it will not reflect light.

A preferred form of mounting is shown in Figs. 6 and 7. The panel 15 is provided at each end with a loop strap 20 consisting of a strap bent to form a loop 21, as shown in Fig. 7, and the panel is rotatably mounted on the pivot pins 16, which pass through the loops 21.

Screws 22 pass through the ends of the loop strap 20 and thread into the nut member 23, as shown in Figs. 6 and 7. By tightening up screws 22, the nut member bears with its edge against the side of the loop strap, thus bending and drawing it in about the pivot pin 16, as shown in Fig. 7, and thus sufficient pressure may be exerted about the pivot pin just to hold the panel firmly in any desired position and still allow it to be easily movable by the hand. Looseness due to wear is taken up by this means from time to time by merely tightening up the screws 22.

I have found that a very good bearing for the pivot pins is formed by providing the inside of loops 21 with strips of leather 24, cementing them in or fastening by other means so that the rough side is presented to the pivot pin. Just enough friction is thus obtained to allow easy movement of the panel, but to firmly hold it in any position in which it is placed. The pivot pins are flattened and bent over at right angles at their outer portions 25 so that they may be inserted at any desired height between the window guide strips 26 and the frame 17, and clamped and frictionally held in place by tightening up screws 27. Thus it will be apparent that a very simple operation serves to install the glare shield.

The loops 21 are slidable longitudinally on the pivot pins 16 and it will be seen that it is only necessary to manufacture shields varying in length by, for instance, half inch intervals to fit the varying widths of different windows, for intermediate differences in window widths can be taken up by slidably adjusting the pivot pins with relation to the loop straps and therefore with relation to the ends of the shield.

While I prefer to use this particular mounting on account of its extreme simplicity, I do not wish to limit the invention to this particular arrangement for it will readily be seen that numerous other adequate mountings may be provided, and are contemplated within the invention.

When it is desired to shield the interior of the car from the heat or glare of the sun, the panel is ordinarily positioned as shown in Fig. 3. If the panel is rotated to the position of Fig. 4, a current of air passes over it and is directed and diffused upwardly into the top of the car by its upwardly bent edge 19. This position, with the glass raised up until it touches the panel, is of great importance when it is desired to have the window up to keep out rain or wind, and still obtain ventilation without allowing a draft upon the heads of the occupants of the car. It will be noted in Fig. 4 that due to the oppositely bent edges 18 and 19, the shield is peculiarly adapted to deflect rain over the edge of the glass 14 while allowing the glass to be down several inches from the top. This position is also useful to cut off more of the direct rays of the sun when the sun is high, and at the same time to produce increased ventilation without causing a troublesome draft, if it is desired to drive with the glass up.

The novelty of this glare shield is in its improved form and in the manner and position of mounting whereby new and improved results are obtained.

It will be noted that its mounting is entirely inside of the window, rather than outside, or within the frame, and several new results are obtained in this position. It makes possible the catching and direction of air upwardly into the top of the car for ventilation purposes; it is placed so that it is out of the way of the glass when it is raised entirely up; and it is operated from the inside so that it may be swung inwardly and upwardly to increase vision, if this is desired, without the necessity of lowering the glass.

The oppositely bent edges of the panel have important functions and are important features of the invention. The inner edge in Fig. 4 makes possible the upward diffusion of the air current, and the two together aid in keeping rain from getting over the glass into the interior of the car.

Also, the form of mounting, whereby it is only necessary to loosen screws already on the car and slip the flattened ends of the pivot pins behind the window guide strips, is a novel feature of the invention. It will also be noted that the pins may be inserted at any height desired, and the shield is therefore easily adjustable with respect to height.

Thus it will be seen that I have provided an effective, easily adjustable sun glare shield, which is also adapted to ventilate a closed car without causing an objectionable draught, which is useful as a rain shield, and which is easily rotated to an inconspicuous inoperative position and installed with extreme simplicity.

I claim:

1. In combination with a window having a frame and window guide strips, a glare shield comprising a panel, pivot pins rotatably carrying the panel, the ends of said pivot pins having flattened portions bent over at right angles and adapted to be inserted and held between the window guide strips and the window frame.

2. In combination with a window having a frame, a glare shield comprising a panel, loop straps at opposite ends of the panel, and pivot pins adapted to be secured to the window frame and swingingly supporting the panel by passing through the loop straps.

3. In combination with a window having a frame, a glare shield comprising a panel, loop straps at opposite ends of the panel, pivot pins adapted to be secured to the window frame and swingingly supporting the panel by passing through the loop straps, and take up means for adjustably tightening the loop straps about the pivot pins.

4. In combination with a window having a frame, a glare shield comprising a panel, loop straps at opposite ends of the panel, pivot pins adapted to be secured to the window frame and swingingly supporting the panel by passing through the loop straps, screws passing through the panel and through the ends of the loop strap, a nut member for each loop strap threaded on the said screws and bearing at its edge upon the side of the loop strap, thus drawing it in and tightening it about the pivot pin when the said screws are tightened.

In witness that I claim the foregoing I have hereunto subscribed my name this 19 day of October, 1927.

WILLIAM R. JACKSON.